US008180755B2

(12) United States Patent
Dalvi et al.

(10) Patent No.: US 8,180,755 B2
(45) Date of Patent: May 15, 2012

(54) MATCHING REVIEWS TO OBJECTS USING A LANGUAGE MODEL

(75) Inventors: Nilesh Dalvi, Menlo Park, CA (US); Shanmugasundaram Ravikumar, Santa Clara, CA (US); Bo Pang, Sunnyvale, CA (US); Andrew Tomkins, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 289 days.

(21) Appl. No.: 12/554,401

(22) Filed: Sep. 4, 2009

(65) Prior Publication Data

US 2011/0060746 A1   Mar. 10, 2011

(51) Int. Cl.
 *G06F 17/30* (2006.01)
(52) U.S. Cl. ....................................................... 707/706
(58) Field of Classification Search .................. 707/706, 707/5, 776, 104; 704/10, 255, 9; 382/133
See application file for complete search history.

(56) References Cited

U.S. PATENT DOCUMENTS

| | | | | |
|---|---|---|---|---|
| 6,556,987 | B1 * | 4/2003 | Brown et al. ........................... | 1/1 |
| 7,130,861 | B2 * | 10/2006 | Bookman et al. ....................... | 1/1 |
| 7,174,348 | B1 * | 2/2007 | Sadhu et al. ........................... | 1/1 |
| 7,490,092 | B2 * | 2/2009 | Sibley et al. ........................... | 1/1 |
| 7,599,930 | B1 * | 10/2009 | Burns et al. ............................ | 1/1 |
| 7,962,461 | B2 * | 6/2011 | Ruhl et al. ..................... | 707/706 |
| 8,001,144 | B2 * | 8/2011 | Novak ........................... | 707/776 |
| 2007/0106499 | A1 * | 5/2007 | Dahlgren et al. ............... | 704/10 |
| 2007/0140543 | A1 * | 6/2007 | D'Errico et al. .............. | 382/133 |
| 2007/0179784 | A1 * | 8/2007 | Thambiratnam et al. ...... | 704/255 |
| 2009/0112576 | A1 * | 4/2009 | Jackson ............................ | 704/9 |
| 2009/0198674 | A1 * | 8/2009 | Custis et al. ...................... | 707/5 |

OTHER PUBLICATIONS

R. Ananthakrishna et al., 'Eliminating Fuzzy Duplicates in Data Warehouses'; Proceedings of the 28th VLDB conference, 2002, pp. 586-596.
L. Barbosa et al., 'For a few dollars less: Identifying review pages sans human labels'; Human Language Technologies: the 2009 Annual Conference of the North American Chapter of the ACL, 2009, pp. 494-502.
I. Bhattacharya et al., 'Collective Entity Resolution in Relational Data'; ACM Transactions on Knowledge Discovery from Data, vol. 1, No. 1, Article 5, Mar. 2007.
C. Cardie, 'Empirical Methods in Information Extraction'; Al Magazine, vol. 18, No. 4, 1997, pp. 65-80.
V. T. Chakaravarthy et al., 'Efficiently Linking Text Documents with Relevant Structured Information'; VLDB '06, Sep. 12-15, 2006, pp. 667-678.

(Continued)

*Primary Examiner* — James Trujillo
*Assistant Examiner* — Thong Vu
(74) *Attorney, Agent, or Firm* — Weaver Austin Villeneuve & Sampson LLP (57) ABSTRACT

A method is provided to associate reviews that have unknown correspondences to tangible entities to structured objects that have known correspondences to tangible entities comprising: transforming a respective review and text from a respective structured object to a collection of words that intersect the respective review and text from the respective structured object; determining a measure of a likelihood of a match as a function of respective probabilities of occurrences of respective words of such intersecting collection within generic review text and respective probabilities of occurrences of respective words of such intersecting collection within structured object text.

19 Claims, 5 Drawing Sheets

OTHER PUBLICATIONS

I. P. Fellegi et al., 'A Theory for Record Linkage'; Journal of American Statistical Association, vol. 64, No. 328, Dec. 1969, pp. 1183-1210.

M. Hu et al, 'Mining Opinion Features in Customer Reviews'; American Association for Artificial Intelligence, 2004, pp. 755-760.

D. V. Kalashnikov et al., 'Exploiting relationships for domain-independent data cleaning'; SIAM International Conference on Data Mining (SDM), Apr. 21-23, 2005, pp. 1-12.

N. Kobayashi et al., 'Collecting Evaluative Expressions for Opinion Extraction'; IJCNLP 2004, LNAI 3248, pp. 596-605, 2005.

J. Lafferty et al., 'Probabilistic relevance models based on document and query generation'; Chapter 1 of W. B. Croft and J. Lafferty (eds.) 'Language Modeling and Information Retrieval', Kluwer Academic Publishers, 2003, Chapter 1, pp. 1-10.

A. McCallum et al., 'Conditional Models of Identity Uncertainty with Application to Noun Coreference'; 17th NIPS, 2004.

H. B. Newcombe et al., 'Automatic Linkage of Vital Records'; Science, vol. 130, 1959, pp. 954-959.

V. Ng et al, 'Examining the Role of Linguistc Knowledge Sources in the Automatic Identification and Classification of Reviews'; in Proc. 21st, COLING/44th ACL, 2006, pp. 611-618.

J. M. Ponte et al., 'A Language Modeling Approach to Information Retrieval'; ACM, 21st SIGIR, 1998, pp. 275-281.

A.-M. Popescu et al., 'Extracting Product Features and Opinions From Reviews'; Proceedings of Human Language Technology Conference and Conference on Empirical Methods in Natural Language Processing (HLT/EMNLP), Oct. 2005, pp. 339-346.

Gerard Salton et al., 'A Vector Space Model for Automatic Indexing'; Communications of the ACM, vol. 18, No. 11, Nov. 1975, pp. 613-620.

S. Sarawagi, 'Information Extraction'; Foundations and Trends® in Databases, vol. 1, No. 3, 2007, pp. 261-377. Note: 2 Documents: Part 1 -pp. 263-332; Part 2—pp. 333-377.

F. Song et al., 'A General Language Model for Information Retrieval'; 22nd SIGIR, 1999, pp. 279-280.

V. Stoyanov et al., 'Topic Identification for Fine-Grained Opinion Analysis'; Proceeding of the 22nd International Conference on Computational Linguistics (Coling 2008), Aug. 2008, pp. 817-824.

J. Yi et al., 'Sentiment Analyzer: Extrating Sentiments About a Given Topic using Natural Language Processing Techniques'; Data Mining, 2003. ICDM 2003, Nov. 9-22, 2003, pp. 427-434.

C. Zhai et al., 'A Study of Smoothing Methods for Language Models Applied to Information Retrieval'; ACM Transactions on Information Systems, vol. 22, No. 2, Apr. 2004, pp. 179-214.

C. Zhai, 'Statistical Language Models for Information Retrieval a Critical Review'; Foundations and Trends® in Information Retrieval, vol. 2, No. 3, 2008, pp. 137-213.

\* cited by examiner

PRIOR ART

FIG. 4

PRIOR ART

FIG. 5

MATCHING REVIEWS TO OBJECTS USING A LANGUAGE MODEL

BACKGROUND OF THE INVENTION

The Internet is an easily accessible worldwide forum to share information about any object. Information about objects can be presented in a structured format, which can be readily available online through various Web listings services, for example. Such information can be easily mapped into tables in a relational database system. Information can also be presented online in largely unstructured, free-text format, such as blogs, news articles, discussion groups, or consumer feedback hosted at e-commerce sites. Since such unstructured information does not come clearly delineated with fields (e.g., location, price), it is much more difficult to establish mapping between such information and a structured table in a typical database system. For example, a Web listing may provide information about a restaurant in a structured format in which information on different aspects of the restaurant is available as values of different fields for the corresponding record, and numerous individual users may create online reviews of the restaurant in highly unstructured formats such as a typical textual review hosted on an online review site, where different aspects of the restaurant are mentioned as part of the running text.

An online user may request that a search engine return an online unstructured text (e.g., a review) relating to a tangible object (e.g., a restaurant) that is represented online by a structured object (e.g. a Web page). For instance, a person may ask that a search engine obtain all user reviews relating to a restaurant named, "Casablanca Moroccan Restaurant", which can be represented as a structured object such as a record in a database. In response to this search request, a search engine typically would seek to obtain as many reviews of this restaurant as possible. Today's Web is replete with restaurant reviews, which may be located in a wide range of different online sources such as newspaper articles, newsgroup discussions, or blogs, for example. However, given the restaurant name and additional information about the restaurant available through structured online listings, the challenge for the search engine is to match the unstructured online reviews to the structured object that represents the restaurant.

Matching unstructured online text descriptions with structured online objects is a pervasive problem in computer networks such as the Internet. A structured object contains text that is descriptive of attributes of some real world physical entity such as a restaurant, a consumer product, or a movie. For a restaurant, the attributes might be name, address and cuisine. For a consumer product such as a camera, the attributes might be price, image resolution, maximum optical zoom, etc. For a movie, the attributes might be title, director, and actors. Given the ambiguities in unstructured text, which is characteristic of natural language (as opposed to values in a database), matching unstructured text to structured objects is a challenging problem. For instance, when a restaurant review contain the word "Food", it can be part of a general comment ("Food was great though price a little high"), or it can be used to refer to the restaurant whose name is Food ("'Food' is one of the best restaurants I have been to"). In contrast, the distinction would have been clear in a database system: it is either a field itself describing one aspect (i.e., "food quality") of restaurant objects, or it is the value of the "name" field. There has been a need for improvement to the matching of unstructured text such as restaurant reviews to a collection of structured objects such as an online listing that serves as an online presence for a tangible object such as a restaurant. The present invention meets this need.

SUMMARY OF THE INVENTION

In one aspect, a method, an article of manufacture and a system are provided to associate reviews that have unknown correspondences to tangible entities such as a restaurant, consumer product or movie, for example, to structured objects, such as Webpages that have known correspondences to such tangible entities.

In some embodiments, a method is provided to transform a respective review and text from a respective structured object to a collection of words that intersect the respective review and text from the respective structured object. A measure is determined of a likelihood of a match between the respective review and the respective structured object as a function of probabilities of occurrences of words of such intersecting collection within sample generic review text and probabilities of occurrences of words of such intersection collection within sample structured object text.

These and other features and advantages of the invention will be apparent from the following description of embodiments thereof in conjunction with the drawings.

DETAILED DESCRIPTION OF EMBODIMENTS

Figure 1:
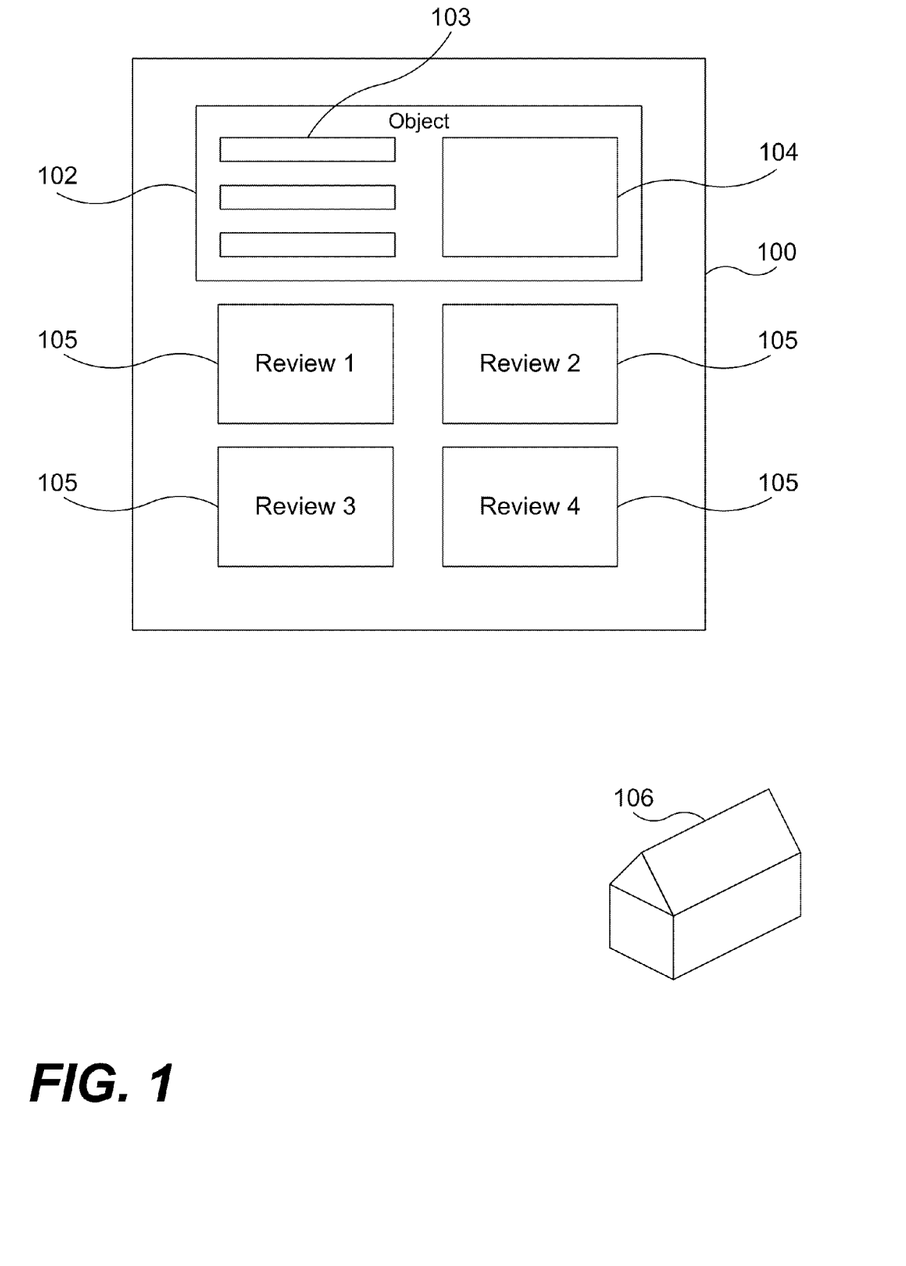
FIG. 1 is an illustrative drawing of a computer screen display showing a structured user interface object and several user-reviews of a real world entity represented by the object.

FIG. 1 is an illustrative drawing of a computer screen display 100 showing a structured user interface object 102 containing attributes 103 and a photo image 104 and several user-reviews 105 of a tangible object 106 represented by the online object 102. An example of object is a restaurant, which is specified by a set of attribute-value pairs, e.g. {name='Casablanca', address='40 Brattle St, Cambridge, Mass.', phone='(XXX) YYYY-9999', cuisine='Moroccan'}. The object is referred to as 'structured' because it contains attributes and values rather than plain text. Individuals or groups who have experience or opinions with an tangible 106 represented by online object 102 often write about their views in an unstructured or informal review which may be shared online through blog posts, news articles, online forums, specialized review sites etc. A review 105 may be no more than a few words or phrases or may graphics or links to pictures or to a video, for example. The structured interface object 102 can be a Webpage that provides information in terms of <attribute value> pairs, for example. However, a structured information object does not have to be presented through Webpages. For instance, a database can serve as a collection of structured objects. Again, such information object is considered to be "structured" because it is organized as <attribute, value> pairs The entries in a typical blog serve as examples of unstructured reviews. For example, a blog containing restaurant unstructured reviews might include an entry that says, "We chose this restaurant because it was rated so high, but I didn't think it was all that great, and it was overpriced. The Mediterranean wraps place is better and cheaper."

The inventors have recognized that some words of a review 105 are drawn from the same words used in a structured online object 102 to describe attributes of the entity 106 (e.g., a restaurant) that is the subject of the review 105, and that other words constitute generic review language independent of the language of the structured online object 102. Typically, a description such as a restaurant review or theatre review, contains some words that are specifically descriptive of a specific restaurant or a particular show, while other words in the review are more generic in that they are likely to be used more widely to refer to a variety of different restaurants or shows. For example, a review of a specific restaurant may include generic review language such as the words, "restaurant", "breakfast" "lunch" and "dinner", and also may include language specifically descriptive of the specific restaurant such as its name and address.

Characteristics of Objects and Reviews

A process in accordance with some embodiments of the invention matches a review 105 to a structured online object 102 based upon both an estimate of the probability that words of the review are drawn from the text of a corresponding structured object 102 and the probability that words of the review 105 constitute generic review language. More formally, let "E" denote a set of objects. Each object "e" that is an element of the set E (i.e. each e∈E) has a set of attributes. Let "text(e)" denote the union of the textual content of all of the attributes of object e. Further, assume that there exists a collection of reviews "R", where each review "r" is written (mainly) about one of the objects in the set E. Reviews, i.e. written descriptions, are modeled as a 'bag of words' in which word order is ignored. The challenge is to correctly associate each review r within the set of reviews R (i.e. each r∈R) with an object e within the set of reviews E (i.e. with exactly one e∈E). Since each review is modeled as a bag of words, the notation "w∈r" is used for a word. For a review r and an object e, let "re" represent the intersection of the bag of words in r with text(e) (i.e., re=r\text(e)).

Pre-processing Based Upon Known Matching Object-review Pairs

A pre-processing training process trains the system as to parameter values to use in matching reviews to objects. The parameter values correspond to words in the review language. More particularly, parameter values are based upon the words within sample reviews (w∈r) and the textual content of attributes (text(e)) of sample structured objects that correspond to such reviews. Pre-processing involves evaluation of the sample reviews and matching sample structured objects. A given sample review r matches a sample structured object e if both the review and the object correspond to or describe the same entity, such as a restaurant, consumer product or movie. The text(e) of a structured object e is the textual content of the attributes of e. For example, if an attribute of a structured object that represents a restaurant is the name of the restaurant, then text(e) for that object e includes the words of the restaurant name. If another attribute of the same object e is the restaurant's street address, city, state and zip code, then text (e) also includes the words used to describe that address information.

During the pre-processing stage, a value is determined for parameter a between 0 and 1 (i.e. a∈(0,1). In some embodiments, $$\alpha = \frac{\sum_{ri'} c(ri \cap \text{text}(ei))}{\sum_{ri'} c(ri)} \quad (1)$$

Where review ri corresponds to structured object ei.

For example, consider the training scenario represented in Table 1:

TABLE 1

| matching ri, ei pair | Count of words in ri ∩ text (ei) | Count of words in ri |
|---|---|---|
| i = 1 | 2 | 12 |
| i = 2 | 7 | 27 |
| i = 3 | 5 | 31 |

For the example in Table 1, $a = 2+5+7/12+27+31 = 7/25 = 0.28; 1-a=0.72$

The constant a represents, overall, a ratio of the number of words of reviews that intersect with words of their matching sample structured objects to the number of words in all sample reviews. In other words, value a is indicative an overall likely proportion of word occurrences used specifically to describe sample structured objects. Conversely, the value 1−a represents, overall, a ratio of the number of words of sample reviews that do not intersect with words of their corresponding matching sample structured objects to the number of words in all sample reviews. That is the value 1−a is indicative an overall likely proportion of word occurrences that are not used specifically to describe a sample structured object and that, therefore, serve as generic review language. The value (a/1−a) is a constant value that is used as a smoothing or damping parameter as explained below.

Let Pe(•) denote a distribution whose support is text(e); this corresponds to the distribution of words specific to the object e, taken from the description text(e). The parameter Pe(w) denotes the probability that the word w is chosen according to distribution Pe(•). Let P(•) be a distribution whose support is the generic review language, i.e., occurrences of a word w within R in which w is used within one or more reviews r but is not taken from respective text(e)'s of the one or more objects e that correspond to the reviews r. The parameter P(w) denotes the probability that the word w is chosen according to distribution P(•). During pre-processing, values are estimated for Pe(•) and P(•) for each of words w within a multiplicity of reviews R based upon the occurrences of words w within individual reviews r and their occurrences within corresponding text(e) of matching objects e.

A review r can be considered as having been generated from an object e in the sense that the entity represented by the object e inspired or motivated a person or group to create the review r. With that perspective in mind, for a given object e, a review r may be considered as having been generated as follows. Each word w in r is generated independently. With probability a, word w is chosen having probability Pe(w), and with probability 1−a, the same word w is chosen having probability P(w). That is, a word w has a probability a that it is generated from information associated with a specific object (i.e. generated from an object-specific distribution Pe(w)), and that same word w has a probability 1−a that it is used in a generic sense (i.e. generated from distribution P(w) underlying the generic review language). Thus, the review generation process can be considered to be multinomial, where the underlying process is a mixture of object-specific language and a generic review language.

The value P(•) represents a distribution of generic review language. Ideally, for each individual review r, if we know the component $r^{(e)}$ that came from the distribution Pe(•) and the component $r^{(g)}$ that came from P(•), then we can collect the $r^{(g)}$ components of all the reviews in R, denoted as $R^{(g)}$, and estimate P(•) by the fraction of occurrences of w in $R^{(g)}$. More specifically, let $c(w, R^{(g)})$ denote a count of the number of times w occurs in $R^{(g)}$. With "addone" smoothing, we estimate $$P(w) = \frac{c(w, R^{(g)}) + 1}{\sum_{w'} c(w', R^{(g)}) + V'} \quad (2)$$

where V is the vocabulary size; and w' is the total number of words including duplicates or repeats of words in $R^{(g)}$.

Generally, we only have access to r and not to the components $r^{(e)}$ and $r^{(g)}$. If we have an aligned review corpus R', where for each review r, we know the true object e that generated such review r, we can closely approximate $r^{(e)}$ with re. That is, we can approximate $r^{(e)}$ based upon the intersections of review-object pairs (r, e). Let no-obj(R') be the set of reviews where for each review-object pair (r, e), words in text(e) are removed from r. By treating no-obj(R') as an approximation of the overall generic review language $R^{(g)}$, we can compute P(w) in the aforementioned manner as indicated in equation (2). If on the other hand, we only have access to a review collection R' with no object alignment, there are other ways to effectively approximate $R^{(g)}$.

One way to compute Pe(w) is to assume a uniform distribution, i.e., Pe(w)=1/|text(e)|. However, each word in text(e) may not be generated with equal probability. Consider, for example, the case of an object representing a restaurant e where text(e) contains the full name of the restaurant, i.e., "Casablanca Moroccan Restaurant." A review for this restaurant is more likely to choose the word "Casablanca" than any other word to specifically refer to this restaurant since the word "Casablanca" is arguably more informative than "Moroccan" or "Restaurant." This tendency can be captured by using the frequency fw of the word w in R. For a suitable function g(w) that varies inversely as fw (e.g., g(w)=log(1/fw)), we let $$P_e(w) = \frac{g(f_w)}{\sum_{w' \in text(e)} g(f_{w'})} \quad (3)$$

It is tempting to assume that common words such as "Restaurant" may not contribute towards matching a review to an object and hence one can conveniently set Pe(w)=0 for such words w. Such a list of words can easily be compiled using a domain-specific stopword list. Care should be exercised in employing such a list, however,—In the above example, the presence of the word "Restaurant" in a review might help to disambiguate the object of reference, if the listing were also to contain a "Casablanca Moroccan Cafe".

Figure 2:
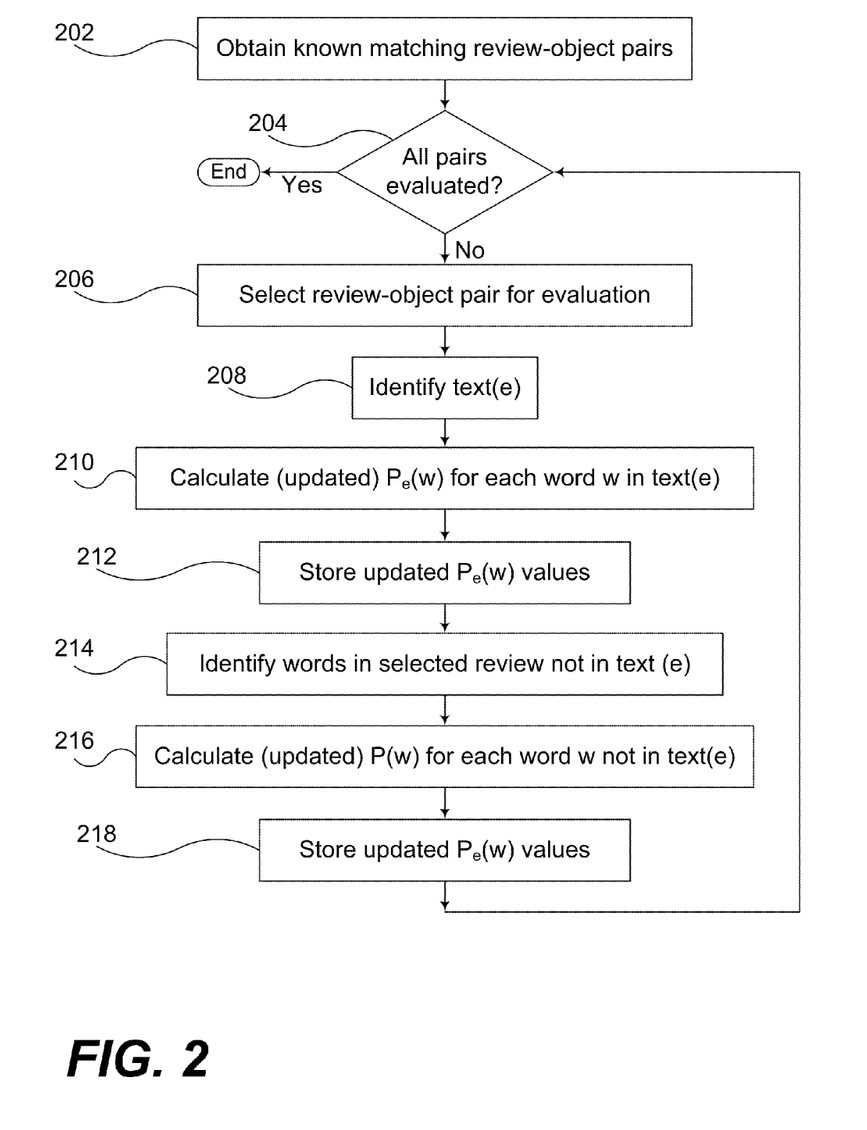
FIG. 2 is an illustrative flow diagram to illustrate a process to pre-process known review/object pairs in accordance with some embodiments of the invention.

FIG. 2 is an illustrative flow diagram to illustrate a process 200 to pre-process known matching review-object pairs in accordance with some embodiments of the invention. The process is implemented with computer software stored in machine readable storage medium, which configures a computer system as a particular machine to execute code that performs the process. The flow diagram includes multiple modules, each representing an aspect of the process 200 that configures a computer processor to perform the act specified by the module.

Module 202 obtains a plurality of known matching review-object pairs (r, e). Decision module 204 determines whether all obtained matching pairs have been evaluated. If decision module 204 determines that there remain review-object pairs that have not yet been evaluated, then module 206 selects a remaining review-object pair for evaluation. Module 208 identifies text(e) for object e of the selected review-object pair (r, e). Module 208 in effect transforms the known review object pair to a text(e) for the pair.

Module 210 computes or updates a value for Pe(•) for each word in identified text(e). The process 200 is recursive; it repeats for each known review-object pair. Pe(w) for a given word w denotes a distribution whose support is the cumulative text(e) for the objects selected for evaluation. Module 210 identifies the words w within text(e) for the selected review-object pair. These word occurrences are used to determine the number of occurrences of words that constitute object-descriptive, non-generic, uses of the word, i.e. an occurrence of the word in the object language, text(e), whether or not that same word also occurs in the review r known to match that object e. With each recursion cycle, the value of Pe(•) is updated for each word in text(e) for the object e in the review-object pair (r, e) currently undergoing evaluation in that cycle. Module 212 stores updated Pe(•) values for words within in text(e) for the review-object pair under evaluation.

Module 214 identifies the words w within review r that do not intersect with text(e) for the selected review-object pair. Module 214 in effect transforms the selected known review-object pair to a collection of words in the review that are not within the object. These word occurrences are used to determine the number of occurrences of words that constitute generic uses of the word, i.e. an occurrence of the word in a review, where that same word does not also occur in the object language, text(e), of the object e known to match the review r.

Module 216 computes or updates a value for P(•) for each word identified by module 214 as being used in a generic sense in the review r of the currently selected review-object pair. P(w) for a given word w denotes a distribution whose support is the cumulative occurrences of generic word usages for the reviews selected for evaluation. With each recursion cycle, the value of P(•) is updated for each generic usage of a word w in r of the currently selected review-object pair (r, e). Module 218 stores updated P(•) values for occurrences of words generically used in r for the review-object pair under evaluation.

Process flow next returns to decision module 204, which determines whether there are additional review-object pairs to evaluate. If not then the process 200 ends. If additional pairs remain to be evaluated then the cycle repeats with module 206 selecting another review-object pair for evaluation.

Identifying Matching Object-review Pairs Based Upon Preprocessing Parameters A process to identify which object matches a given review in accordance with some embodiments of the invention identifies intersection, re, for the pairing of the given review with each of a plurality of different objects. A score is determined for each such pairing as a function of Pe(w) and P(w) for each word w in re for the pairing. More particularly, the score is determined as a function of a ratio defined in terms of Pe(w) and P(w). Even more particularly, in some embodiments the ratio is defined as Pe(w)/P(w). A selection of at least one of the plurality of objects to associate with the given review is made based upon the plurality of scores.

More specifically, in some embodiments, the most likely object e* that generated a review r is determined based upon the following expression, $$e^* = \arg\max_e \sum_{w \in r_p} \log\left(1 + \frac{\alpha}{1-\alpha} \frac{P_e(w)}{P(w)}\right) \quad (4)$$

A process according to the above formulation generates a score for possible pairings of reviews and objects. The pairing that generates the highest score is determined to be the matching pair. For each word in a set of matching words re for a review-object pair (r, e), a score value is determined as a function of Pe(w) and P(w) for the words w within re. Note that the above function gives less importance to common words, which are words that have higher P(w) values. More specifically, a score value is determined based upon individual ratios, for individual words w within re, of the probability that the word is specifically descriptive of the object (Pe(w)) versus the probability that the word is a generic descriptive word (P(w)). The individual ratios are smoothed or dampened using parameter a/1−a. In other words, differences between very frequent words and very infrequent words are somewhat smoothed out.

Note that in the above equation (4), the parameter Pe(w) in expression, $$1 + \frac{\alpha}{1-\alpha} \frac{P_e(w)}{P(w)}$$

has the effect of normalizing object length. Thus, longer objects are not preferred because of more words, as Pe(w) becomes smaller for each word. It also has the effect of penalizing reviews that are missing critical words present in the text(e) of an object e. The parameter P(w) also contributes to distinguishing objects. For example, consider a review containing words "Food" and "Casablanca" and a restaurant named "Food" and a restaurant named "Casablanca". Considering the fact that "Food" is much more likely to be an object-independent term, the P(w) term can still distinguish the objects corresponding to the two aforementioned restaurants even when Pe(w) are equal for "Food" and "Casablanca".

Moreover, as explained above, P(w) is estimated on reviews with object mentions removed, since the model indicate that P(w) accounts for object-independent review language. Consider a review that reads " . . . . Maggiano's has great Fondue . . . " "Maggiano's" is likely to get a much smaller probability in the generic review distribution P(•) than "Fondue", since "Maggiano's" almost always occurs in reviews as restaurant name mentions, thus removed from the estimation of its P(•) probability. On the other hand, the word "Fondue" is more likely to retain higher probability in P(•) since it tends to appear as dish names. As a result, our model will assign higher weight to "Maggiano's Restaurant" than "Fondue Restaurant". Thus, the process advantageously evaluates the ability of a word to identity the review object rather than rely on the absolute rarity of the word to determine whether or not such word is descriptive or generic.

Figure 3:
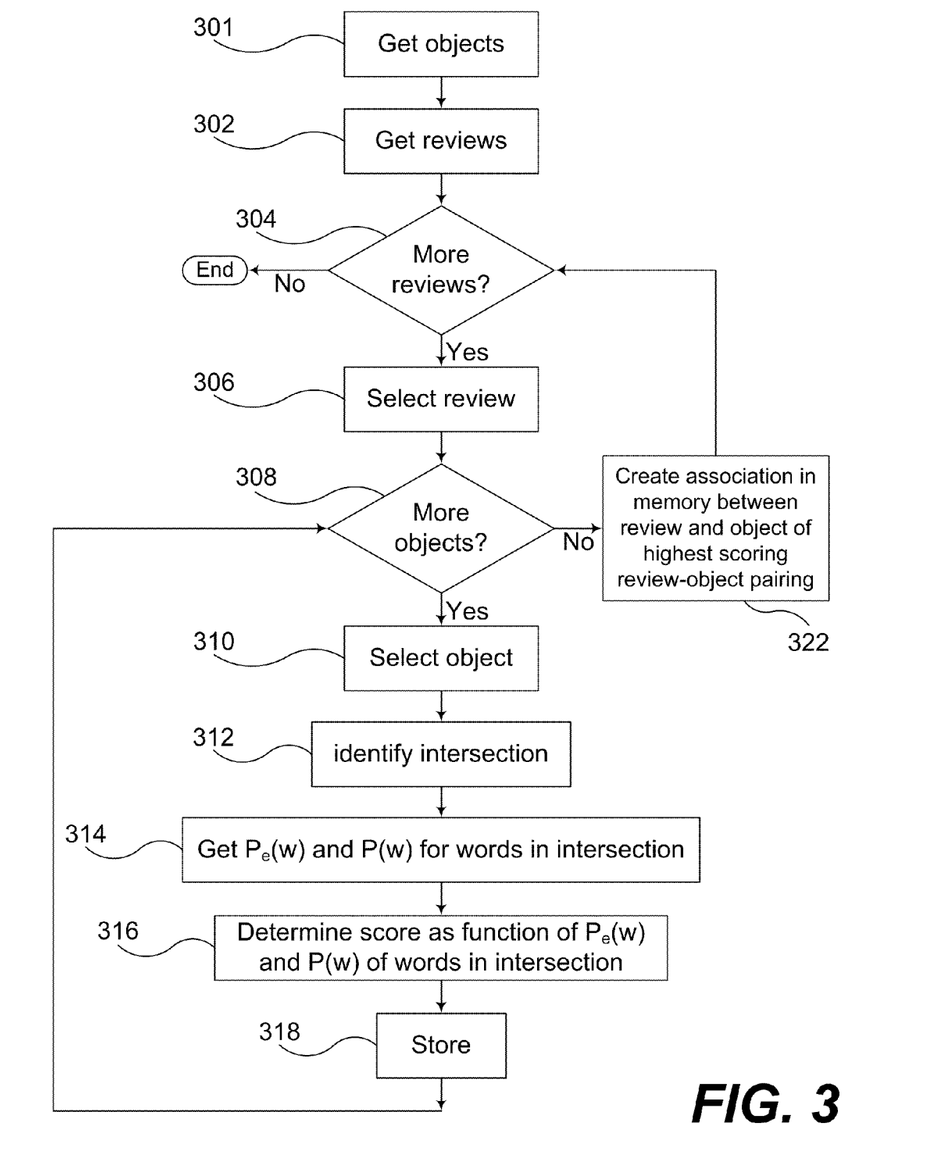
FIG. 3 is an illustrative flow diagram to illustrate a process to match a review to an object in accordance with some embodiments of the invention.

FIG. 3 is an illustrative flow diagram to illustrate a process 300 to match a review to an object in accordance with some embodiments of the invention. The process is implemented with computer software stored in machine readable storage medium that configures a computer system to become a particular machine that executes code to perform the process. The flow diagram includes multiple modules, each representing an aspect of the process 300 that configures a computer processor to perform the act specified by the module.

Module 301 obtains a plurality of objects. These objects come from the data owned by the user, e.g. a list of businesses or a list of products. Module 302 obtains a plurality of reviews, which can be obtained by simply crawling the Web or by other means, for example. Decision module 304 determines whether there are reviews that have been obtained by module 302 that have not yet been processed. If yes, then module 306 selects a review r for evaluation. Decision module 308 determines whether there are objects that have not yet been compared with the currently selected review. If yes, then module 310 selects an object e for comparison with the selected review r.

Module 312 identifies re, the intersection of the language of the selected review r and text(e) of the selected object e. In other words, module 312 transforms the words of the selected review r potentially corresponding to a tangible entity that is represented by the selected object e containing the text(e) to a collection words re that the selected r and text(e) of the selected e share in common. Module 312 in effect transforms the selected review-object pair to text(e) for the pair. Module 314 retrieves values of P(w) and Pe(w) for each word w identified within re. Module 316 computes a value, e.g., a score e*, that is a function of Pe(w)/P(w) for all of the words in re, where the value is indicative of the likelihood that the selected review r matches the selected object e. In some embodiments, the value is a function of $$1 + \frac{\alpha}{1-\alpha} \frac{P_e(w)}{P(w)},$$

where $$\frac{\alpha}{1-\alpha}$$

serves as a damping or smoothing factor. More specifically, in some embodiments, the expression of equation (4) serves as the function. Module 318 stores the value computed by module 316.

Process flow next returns to decision module 308, which determines whether there remain objects that have not yet been selected for matching evaluation with the currently selected review. If yes, then the process 300 again flows to module 310 for selection of one of the remaining objects, and the matching comparison cycle repeats for the newly selected object. If no, then process flow moves to module 320, which compares scores stored by module 318 for the currently selected review r, and determines which object to associate the selected review with based upon the scores. In some embodiments, module 320 compares scores computed for each matching evaluation and identifies the object that resulted in the highest score. Module 322 creates an association in computer readable storage media between the identified object and the selected review. The association results in a particular machine in which the review and its matching online object are linked together by such association. Such association can be used is alternate ways. For instance, users can be presented all the reviews associated with an object when they look for objects. Alternatively, reviews can be aggregated and summarized for each object.

Process flow next moves to decision module 304, which determines whether additional reviews remain to be processed. If yes, then the process flow returns to module 306, which selects another review, and the cycle repeats for the newly selected review. If no, then the process 300 ends.

EXAMPLE

The following example involves matching of a sample review $r_s$ against two sample objects e1 and e2.

$r_s$="Krung That Restaurant in Mountain View has great food!!"
e1="Krung That, Mountain View"
e2="Mountain That Restaurant, Sunnyvale".
a=0.02
The P(•) values are set forth in Table 2:

TABLE 2

| Word | P(.) value |
|---|---|
| Krung | 2.03E–06 |
| Thai | 0.00048 |
| Restaurant | 0.0037 |
| Mountain | 4.35E–05 |
| View | 0.0004 |
| Sunnyvale | 5.67E–06 |

In this example, assume a uniform Pe(•), i.e., since there are four (4) words in each entity, let Pe(•)=¼ for each word.
Then, according to equation (4), $$\begin{aligned}\text{score}(e1) &= \text{score}(\text{Krung}) + \text{score}(\text{Thai}) + \text{score}(\text{Mountain}) + \text{score}(\text{View}) \\ &= \log(1 + 0.02/0.98^*0.25/2.03E - 06) + \\ &\quad \log(1 + 0.02/0.98^*0.25/0.00048) + \\ &\quad \log(1 + 0.02/0.98^*0.25/4.35E - 05) + \\ &\quad \log(1 + 0.02/0.98^*0.25/0.0004) \\ &= 7.83 + 2.45 + 4.77 + 2.62 = 17.67\end{aligned}$$

$$\begin{aligned}\text{Score}(e2) &= \text{score}(\text{Mountain}) + \text{score}(\text{Thai}) + \text{score}(\text{Restaurant}) \\ &= 4.77 + 2.45 + 0.87 = 8.09\end{aligned}$$

Thus, e1, which has the highest score, is matched to the sample review $r_s$.

Computer System

Figure 4:
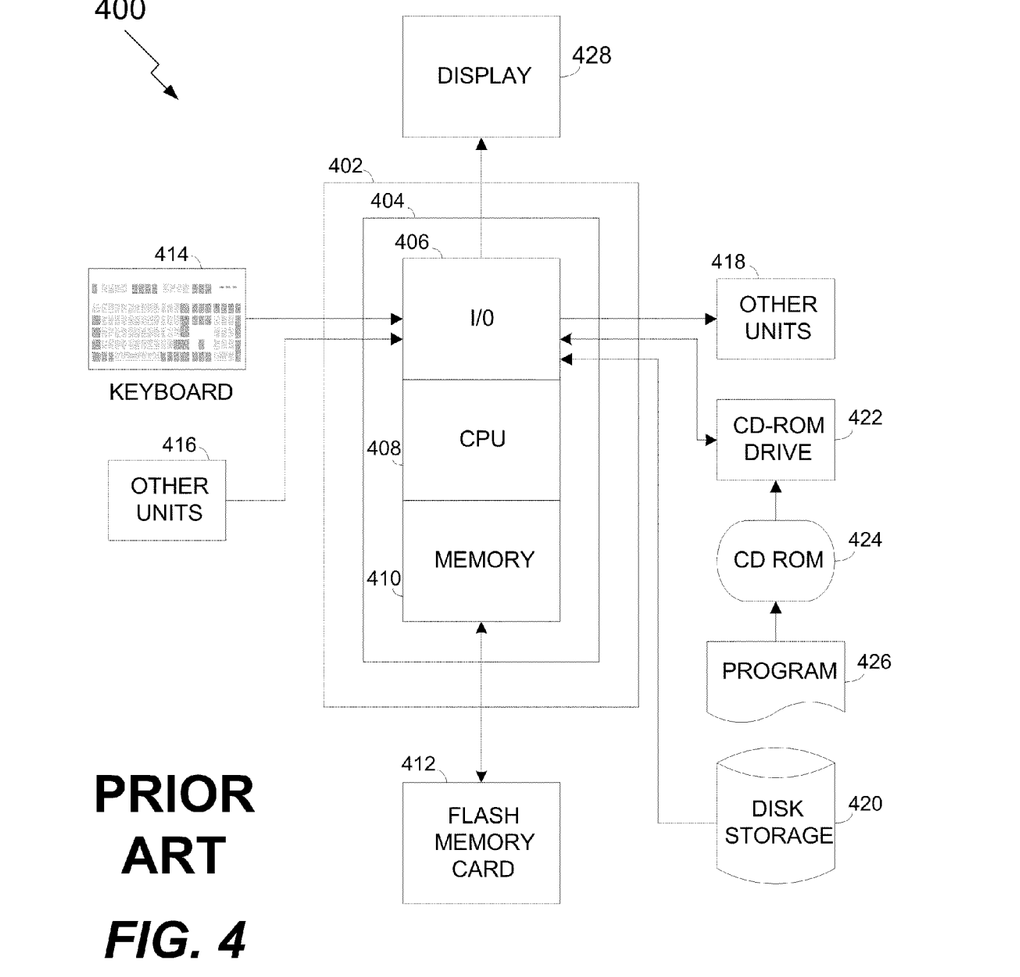
FIG. 4 is an illustrative drawing of a general purpose computer with a number of components.

FIG. 4 is an illustrative drawing of a computer 400 with a number of components. The main system 402 includes a motherboard 404 having an input/output (I/O) section 406, one or more central processing units (CPU) 408, and a hardware storage media section 410, which may have a flash memory card 412 related to it. The I/O section 406 is connected to a display unit 428, a keyboard 414, other similar computer units 416, 418, a disk storage unit 420 and a CD-ROM drive unit 422. The display unit 428 can be used to produce the screen display of 100, for example. The CD-ROM drive unit 422 can read a CD-ROM medium 424 which typically contains programs 426 to run processes 200 or 300 and other data.

Internet Network Configuration

Figure 5:
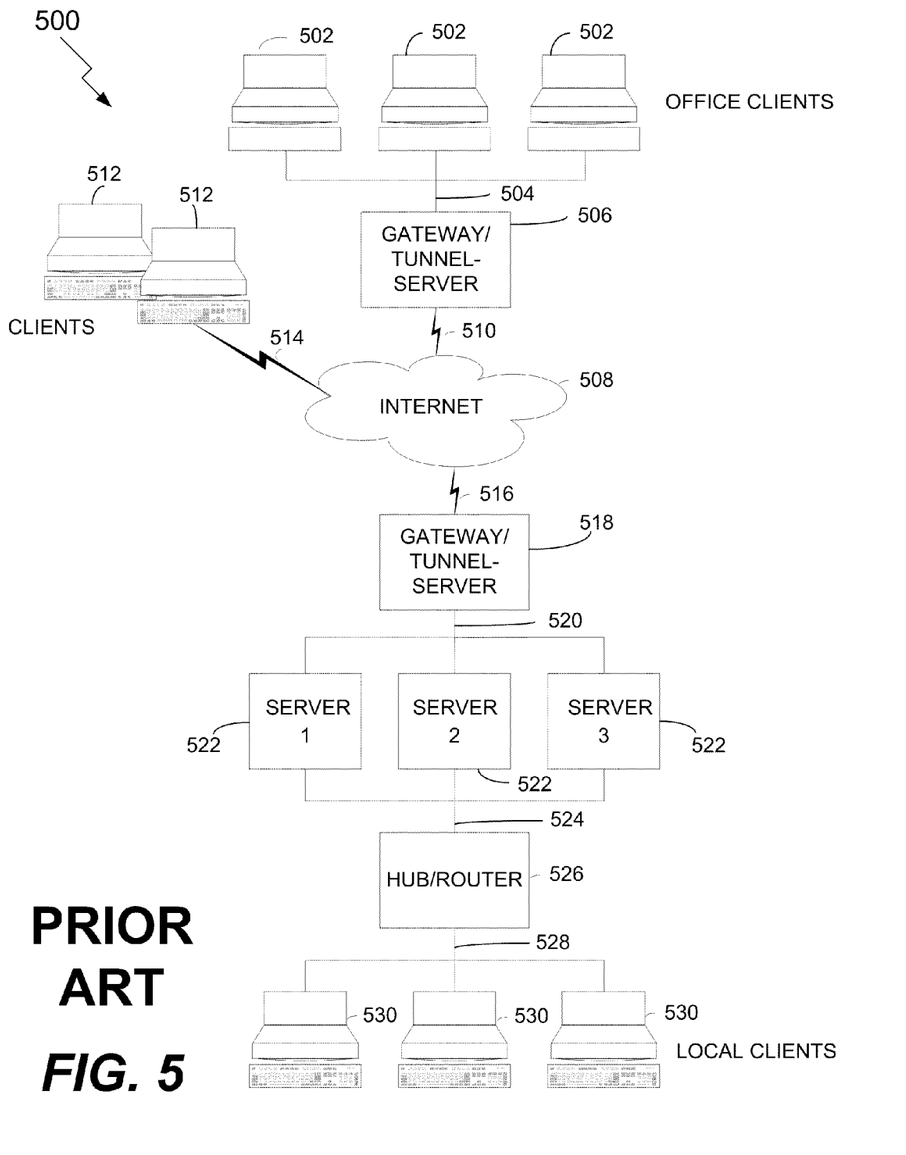
FIG. 5 is an illustrative drawing showing an Internet network configuration including a client machines and servers.

FIG. 5 is an illustrative drawing showing an Internet network configuration 500, where a number of office client machines 502, possibly in a branch office of an enterprise, are shown connected 504 to a gateway/tunnel-server 506 which is itself connected to the Internet 508 via some internet service provider (ISP) connection 510. Also shown are other possible clients 512 similarly connected to the Internet 508 via an ISP connection 514. An additional client configuration is shown for local clients 530 (e.g., in a home office). An ISP connection 516 connects the Internet 508 to a gateway/tunnel-server 518 that is connected 520 to various enterprise application servers 522. These servers 522 are connected 524 to a hub/router 526 that is connected 528 to various local clients 530.

Servers 522 may be programmed to execute the processes 200 so as to compute values for P(•) and Pe(•) and a for known matching review-object pairs. Servers 522 also may be programmed to execute process 300 to search the Web for reviews and objects and to match reviews to objects. Furthermore, servers 522 may be programmed to respond to user requests for reviews that are associated with structured objects such as a Web page representing some physical entity such as a restaurant, consumer item or movie, sent via clients 512 or local clients 530

Although only certain exemplary embodiments of this invention have been described in detail above, those skilled in the art w·ill readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

The invention claimed is:

1. A method to associate reviews that have unknown correspondences to tangible entities and that are stored in computer readable storage media to structured objects that have known correspondences to tangible entities and that are stored in computer readable storage media comprising:
   for each of a plurality of possible matchings of a respective review with a different respective structured object from among a plurality of structured objects, transforming the respective review, and text from the respective structured object, to a collection of words that intersect the respective review and the text from the respective structured object;
   for each respective collection of intersecting words, determining a measure of a likelihood of a match between the respective review and the respective structured object as a function of respective probabilities of occurrences of respective words of such intersecting collection within generic review text and respective probabilities of occurrences of respective words of such intersecting collection within structured object text;
   determining a matching of the respective review with a structured object from among the plurality of structured objects based upon the computed measure; and
   storing in computer readable storage media, indicia of the determined matching.

2. The method of claim 1, wherein each respective review consists of unstructured text.

3. The method of claim 1, wherein respective structured objects include respective Webpages.

4. The method of claim 1, wherein determining further includes determining as a function of a likely proportion of word occurrences that are used specifically to describe a structured object to a likely proportion of word occurrences that are likely not used specifically to describe a structured object.

5. The method of claim 1 further including: displaying on a device screen display indicia of the of the respective matching of the respective description with the respective structured object.

6. The method of claim 1, wherein determining includes determining according to a function that computes respective ratios of respective probabilities of occurrences of respective words of such collection within generic review text to respective probabilities of occurrences of respective words of such collection within structured object text.

7. The method of claim 6, wherein determining includes determining according to a function that computes a sum of the respective ratios.

8. The method of claim 7, wherein determining includes determining according to a function that smooths the sum through multiplication by a ratio of a proportion of words of sample reviews that intersect with words of their matching sample objects to the number of words in all sample reviews to a proportion of words of sample reviews that do not intersect with words of their corresponding sample objects.

9. The method of claim 1, wherein determining includes determining according to a function represented by the expression, $$e^* = \arg\max_e \sum_{w \in r_e} \log\left(1 + \frac{\alpha}{1-\alpha} \frac{P_e(w)}{P(w)}\right)$$

wherein re represents the collection of intersecting words w; a represents, overall, a proportion of words of sample reviews that intersect with words of their matching sample objects to the number of words in all sample reviews; 1-a represents, overall, a proportion of words of sample reviews that do not intersect with words of their corresponding sample objects; Pe(w) denotes a probability that a word w is chosen according to distribution Pe(.cndot.); P(w) denotes the probability that a word w is chosen according to a distribution P(.cndot.).

10. The method of claim 1 further including:
configuring a computer system to execute a process to transform the respective review and text from the respective structured object to a collection of words that intersect the respective review and text from the respective structured object.

11. The method of claim 1, wherein for individual words of the collection, a probability of an occurrence of such word within generic review text is a functions of a ratio of a count of a number of times a such word is used generically in a sample reviews to a number of times such word is used specifically to describe a matching sample structured object in such sample reviews.

12. The method of claim 11, wherein for individual words a probability of an occurrence of such word within generic review text is a functions according to the following expression, $$P(w) = \frac{c(w, R^{(g)}) + 1}{\sum_{w'} c(w', R^{(g)}) + V'}$$

where R.sup.(g) represents the generic components of all reviews; V is the vocabulary size; and w' is the total number of words including duplicates or repeats of words in R.sup.(g).

13. The method of claim 1, wherein for individual words of the collection, a probability of an occurrence of such word within structured object text is a function of an inverse of the frequency of occurrence of the word in sample reviews.

14. The method of claim 1 further including:
configuring a computer system to execute a process to determine a measure of a likelihood of a match as a function of respective probabilities of occurrences of respective words of such collection within generic review text and respective probabilities of occurrences of respective words of such collection within structured object text.

15. An article of manufacture that includes a non-transitory machine readable storage medium that includes program code to configure a computer system to perform a process comprising:
for each of a plurality of possible matchings of a respective review with a different respective structured object from among a plurality of structured objects, transforming the respective review and text from the respective structured object to a collection of words that intersect the respective review and the text from the respective structured object;
for each respective collection of intersecting words, determining a measure of a likelihood of a match between the respective review and the respective structured object as a function of respective probabilities of occurrences of respective words of such intersecting collection within generic review text and respective probabilities of occurrences of respective words of such intersecting collection within structured object text;
determining a matching of the respective review with a structured object from among the plurality of structured objects based upon the computed measure; and
storing in computer readable storage media, indicia of the determined matching.

16. A system comprising:
means for transforming a respective review and respective text from a respective structured object to a collection of words that intersect the respective review and the text from the respective structured object;
means for determining a measure of a likelihood of a match between the respective review and the respective structured object as a function of respective probabilities of occurrences of respective words of such intersecting collection within generic review text and respective probabilities of occurrences of respective words of such intersecting collection within structured object text; and
storage media to store the determined measure.

17. The system of claim 16 further including: means for determining a matching of the respective review with a respective structured object from among the plurality of structured objects based upon the computed measures.

18. The system of claim 16, wherein the respective review consists of unstructured text.

19. The system of claim 16, wherein the respective structured object includes a respective Webpage.

* * * * *